United States Patent
Gustafson

(10) Patent No.: US 7,131,275 B2
(45) Date of Patent: Nov. 7, 2006

(54) GAS TURBINE ENGINE SYSTEM HAVING AN ELECTRIC STARTER MOTOR WITH INTEGRAL CLUTCH

(75) Inventor: James R. Gustafson, Granby, MA (US)

(73) Assignee: Hamilton Sundstrand, Windsor Locks, CT (US)

(*) Notice: Subject to any disclaimer, the term of this patent is extended or adjusted under 35 U.S.C. 154(b) by 269 days.

(21) Appl. No.: 10/313,175

(22) Filed: Dec. 6, 2002

(65) Prior Publication Data

US 2004/0107703 A1    Jun. 10, 2004

(51) Int. Cl.
*F02C 7/275* (2006.01)

(52) U.S. Cl. .................. 60/788; 60/786; 60/802; 310/75 R; 310/92; 310/100; 417/410.1; 417/423.7

(58) Field of Classification Search ............... 60/788, 60/802, 786; 310/75 R, 92, 100; 290/38 R, 290/48; 417/423.7, 410.1, 355
See application file for complete search history.

(56) References Cited

U.S. PATENT DOCUMENTS

| | | | | |
|---|---|---|---|---|
| 3,831,373 A | * | 8/1974 | Flynt | 60/802 |
| 3,951,008 A | * | 4/1976 | Schneider et al. | 74/661 |
| 4,475,075 A | * | 10/1984 | Munn | 322/1 |
| 4,514,976 A | * | 5/1985 | Christoff | 60/785 |
| 4,912,921 A | * | 4/1990 | Rice et al. | 60/774 |
| 5,174,109 A | * | 12/1992 | Lampe | 60/788 |
| 5,555,722 A | * | 9/1996 | Mehr-Ayin et al. | 60/788 |
| 5,770,904 A | * | 6/1998 | Rasch et al. | 310/75 R |
| 5,783,932 A | | 7/1998 | Namba et al. | |
| 5,899,411 A | | 5/1999 | Latos et al. | |
| 5,911,678 A | | 6/1999 | White | |
| 5,997,261 A | * | 12/1999 | Kershaw et al. | 417/366 |
| 6,066,898 A | | 5/2000 | Jensen | |
| 6,208,049 B1 | * | 3/2001 | Rennefeld et al. | 310/75 R |
| 6,242,881 B1 | | 6/2001 | Giordano | |
| 6,305,156 B1 | | 10/2001 | Lui | |
| 6,308,794 B1 | * | 10/2001 | Oppitz | 180/65.2 |
| 6,318,958 B1 | | 11/2001 | Giesler et al. | |
| 6,328,526 B1 | | 12/2001 | Seki et al. | |
| 6,374,592 B1 | | 4/2002 | Box et al. | |

FOREIGN PATENT DOCUMENTS

| | | |
|---|---|---|
| DE | 816 944 | 10/1951 |
| DE | 100 32 681 | 2/2002 |
| JP | 08322192 | 12/1996 |

OTHER PUBLICATIONS

International Search Report, Nov. 2, 2004.

* cited by examiner

*Primary Examiner*—William H Rodriguez
(74) *Attorney, Agent, or Firm*—Carlson, Gaskey & Olds

(57) ABSTRACT

A gas turbine engine system includes an electric starter motor which utilizes a partially hollow or cupped shaped rotor. Space is provided inside the rotor to fit the required clutch, bearings, and drive shaft. A rotor shaft drives the input shaft through the clutch. The clutch is mounted within a clutch cavity formed within an annular housing portion of the housing. The annular housing portion is at least partially conical and preferably extends at least partially within a hollow rotor mounted to the rotor shaft. A short package is provided due to the telescoped architecture while retaining the maximum length for electromagnetics.

11 Claims, 3 Drawing Sheets

|  | WEIGHT (LB.) | LENGTH (IN.) | OVERHUNG MOMENT (IN LB) |
|---|---|---|---|
| PRIOR ART MOTOR / CLUTCH | 350 | 26 | 5600 |
| WITH HOLLOW ROTOR / CLUTCH | 233 | 15 | 1700 |
| IMPROVEMENT | 33% | 42% | 69% |

GAS TURBINE ENGINE SYSTEM HAVING AN ELECTRIC STARTER MOTOR WITH INTEGRAL CLUTCH

BACKGROUND OF THE INVENTION

The present invention relates to a gas turbine engine, and more particularly to a compact electric starter motor therefor.

Current starting systems for marine and industrial gas turbine engines includes pneumatic and hydraulic start systems. While these systems are effective there may be certain limitations and drawbacks to each. Some of these limitations include: high failure rates; usage of high pressure fluids; lack of accurate speed and torque control during starting, restarting and motoring cycles; and a relatively large overall system space requirements.

Electrical starter systems offers several advantages over pneumatic or hydraulic start systems including: lower overall system volume and cost; higher reliability; improved speed/torque control for starting, re-engagement, and motoring; improved self test and health monitoring; and elimination of potentially hazardous fluids. However, conventional electrical start systems that generate sufficient power to rotate the gas turbine system are relatively large and cumbersome.

A conventional electrical starter includes a central rotor shaft surrounded by a stationary winding (stator). The rotor is supported at each end by bearings mounted outside the axial envelope of the stator. When this arrangement is combined with a separate clutch, the length of the combined shaft, clutch and motor assembly exceeds the axial length available adjacent an industrial gas turbine engine gearbox.

Accordingly, it is desirable to provide a relatively compact electrical starter system that will reasonably fit and operate on the accessory gearbox of a gas turbine engine.

SUMMARY OF THE INVENTION

The gas turbine engine system according to the present invention integrates the clutch and the motor together in a unique fashion that reduces the overall size and increases the power density of the electric starter motor. This results in a package that can reasonably fit on an accessory gearbox and provide the required functions and power density.

This electric starter motor design architecture utilizes a partially hollow or cupped shaped rotor. Space is therefore provided inside the rotor to fit the required clutch, bearings, and drive shaft. A short package is provided due to the telescoped architecture while retaining the maximum length for electromagnetics.

The present invention therefore provides a greater power density for a given volume electric starter motor package.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
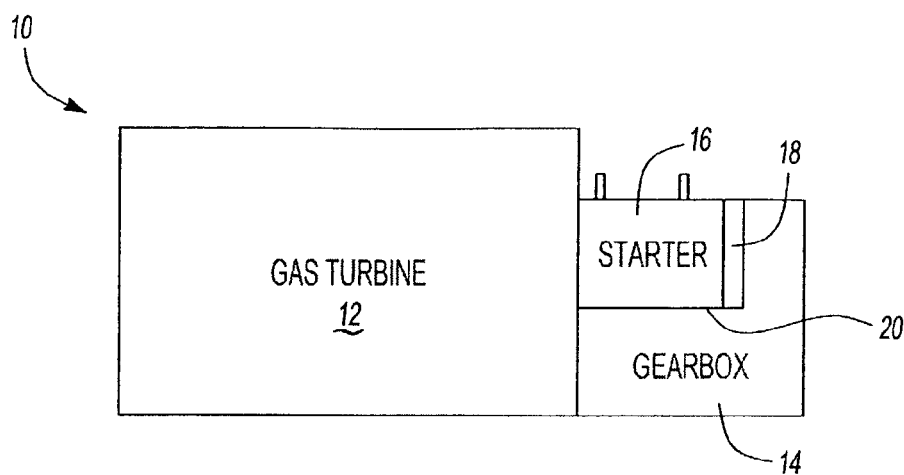
FIG. 1 is a general schematic view of a gas turbine engine system.

FIG. 1 illustrates a schematic block view of a gas turbine engine system 10 for industrial or marine usage. The system 10 includes a gas turbine engine 12 an accessory gearbox 14 mounted to the gas turbine engine 12 to initiate rotation thereof and an electric starter motor 16 operable to drive the accessory gearbox 14. It should be understood that although a particular component arrangement is disclosed in the illustrated embodiment, other arrangements will benefit from the instant invention.

The starter motor 16 drives the accessory gearbox 14 through a clutch 18 which is preferably contained within a housing 20 of the electric starter motor 16. The housing 20 is relatively compact such that the starter motor 16 will fit completely upon the accessory gear box 14. A relatively compact system 10 which reduces packaging space is thereby provided. The system 10 may therefore be located in heretofore unavailable spaces.

Figure 2:
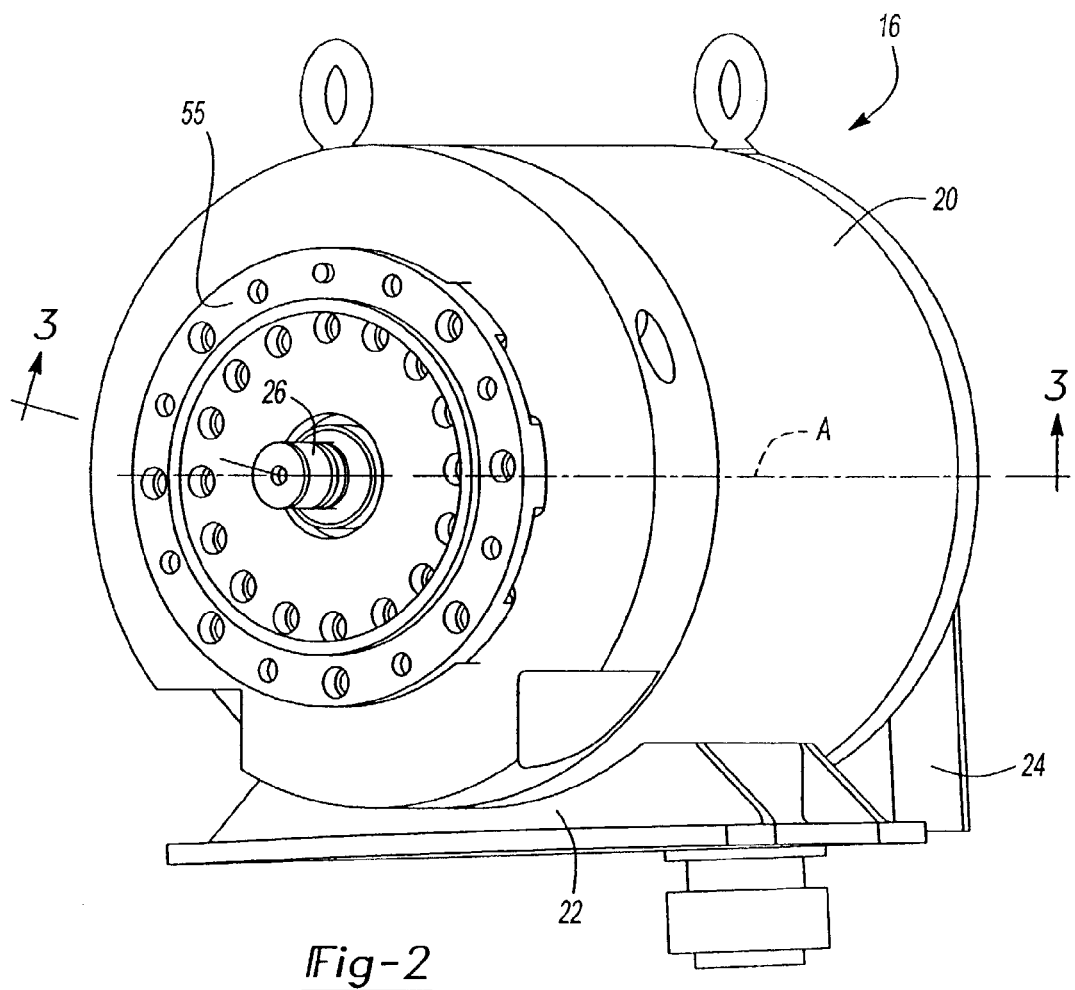
FIG. 2 is a perspective view of an electric starter motor designed according to the present invention.

Referring to FIG. 2, the electric starter motor 16 includes a base 22, flange 55, and a power junction box 24 mounted to the housing 20. The flange 55 allows direct mounting to the accessory gear box 14. The base 22 allows auxiliary mounting to the gas turbine 12 or other supporting structure. The junction box 24 is mounted to the housing 20 longitudinally opposite an input shaft 26 which defines a longitudinal axis A of the electric starter motor 16.

Figure 3:
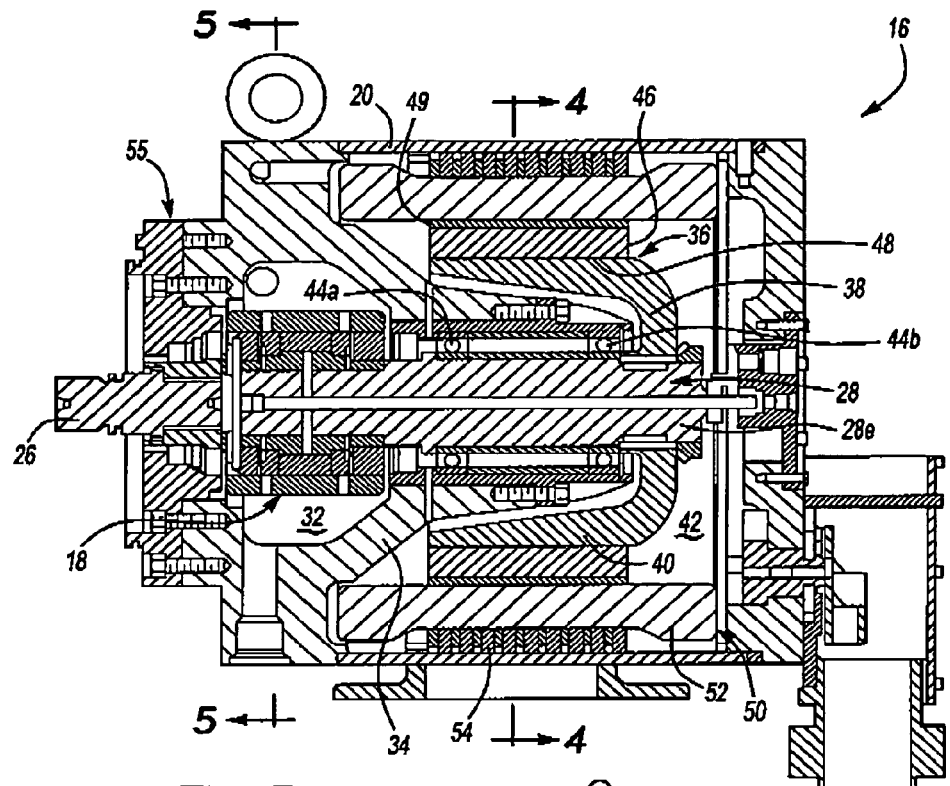
FIG. 3 is a longitudinal sectional view of the electric starter motor taken along line 3—3 of FIG. 2.

Referring to FIG. 3, a sectional view along the axis of rotation A through the housing 20 of the starter motor 16 is illustrated. A rotor shaft 28 drives the input shaft 26 through the clutch 18. The clutch 18 is preferably a high speed overrunning clutch such as that manufactured by Hilliard Corporation™ of Elmira N.Y. The clutch 18 is mounted within a clutch cavity 32 formed within an annular housing portion 34 of the housing 20. Preferably, the annular housing portion 34 is at least partially conical and preferably extends at least partially within a hollow rotor 36 mounted to the rotor shaft 28.

Figure 4:
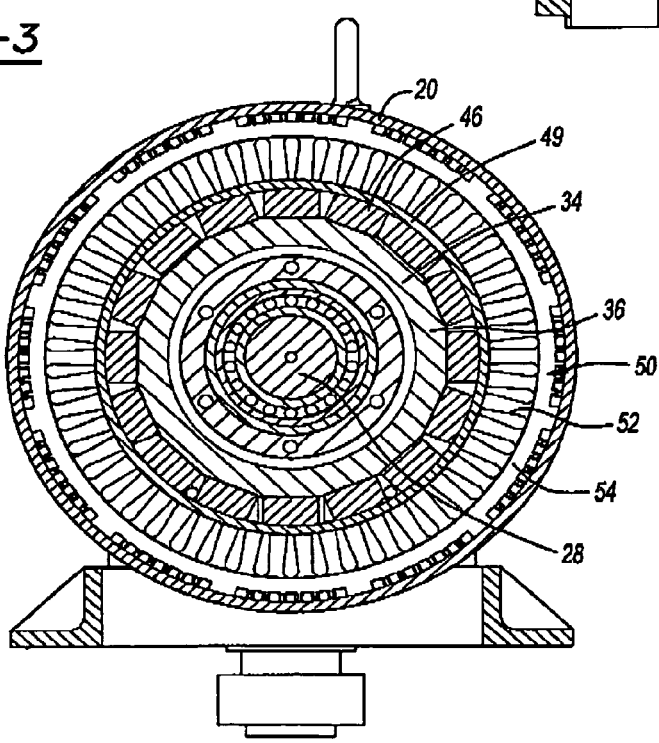
FIG. 4 is a sectional view of the electric starter motor taken along line 4—4 of FIG. 3.

The hollow rotor 36 includes a base portion 38 and an annular rotor portion 40 extending from the base portion 36. The base portion 38 is substantially transverse to axis A and the annular rotor portion 40 is substantially parallel to the axis A. The base portion 38 is mounted nearan shaff end segment 28c of the motor shaft 28. In other words, the rotor 36 is substantially cup shaped such that the annular rotor portion 40 at least partially contains the annular housing portion 34 (also illustrated in FIG. 4). Various fluid passageways 43 (FIG. 5) communicate fluids to and from the cavities 32, 42 to assume proper lubrication, cooling, and airflow. It should be understood that numerous passageway configurations will benefit from the present invention.

The rotor 36 rotates with the rotor shaft 28 within a rotor cavity 42. The clutch cavity 32 and the rotor cavity 42 are preferably separate fluid cavities. The cavities 32, 42 contain a fluid lubricant or the like. As the cavities 32, 42 are separate particular fluids may be contained within each cavity.

The shaft 28 is mounted to the annular housing portion 34 through a bearing assembly 44a and 44b. The bearing assembly 44a and 44b are located at least partially within the annular rotor portion 40. That is, the bearings 44a, 44b are contained within an outer axial envelope defined by the rotor 36. An exceeding compact starter motor 16 is thereby provided as the starter motor 16 is essentially telescoped in on itself because of the hollow rotor 36.

A permanent magnet 46 is mounted to the outer surface 48 of the rotor 36 through adhesion and/or cylindrical sleeve 49 or the like. It should be understood that a contiguous or segmented magnet will benefit from the present invention. The permanent magnet 46 takes full advantage of the axial length of the housing which provides a relatively powerful motor in spite of the telescoped architecture. Notably, the permanent 46 is mounted along the annular root portion 40 such that the permanent magnet does not extend beyond the shaft end segment 28e. Annular rotor portion 40 also functions as the magnetic "back iron" for the magnets, completing the magnetic flux path with the rotor portion on the motor. The rotor rotates within a stator 50 as generally known. The stator 50 includes stator windings 52 within a metallic lamination 54. stator Windings 52 preferably include copper wire or other conductive filaments.

Figures 5, 6:
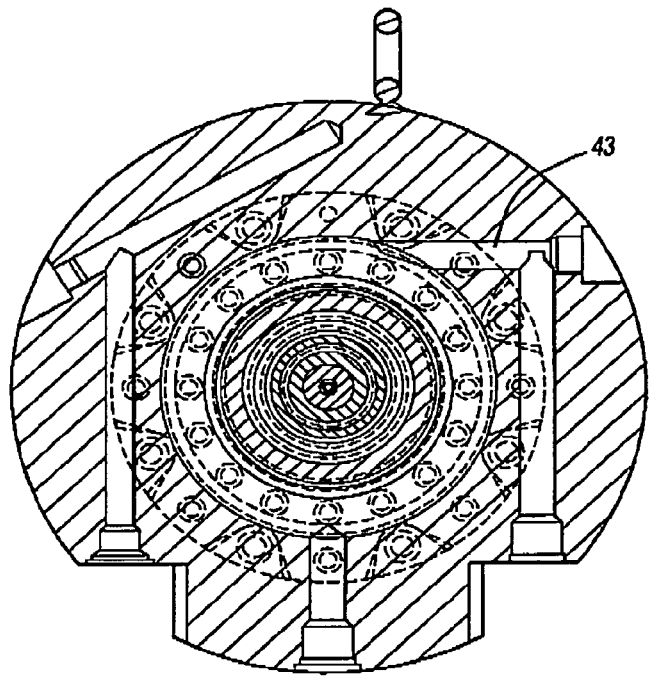
FIG. 5 is a sectional view of the electric starter motor taken along line 5—5 of FIG. 3.
FIG. 6 is a chart comparing a 200 HP electric starter motor designed according to the present invention as compared to a conventional 200 HP starter motor in terms of weight, length and overhung moment.

It should be understood that various stator constructions will benefit from the geometry of the present invention. The starter motor 16 having rotor architecture of the present invention, however, provides advantages in terms of weight, length and overhung moment as compared to a conventional starter motor. For example only, FIG. 6 compares a 200 HP motor designed according to the present invention to a conventional 200 HP. The motor architecture of the present invention therefore allows for a unique integration of the clutch and a higher power density which provides the functionality and required power in a package that is far smaller than a typical electric motor and clutch arrangement.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An electric motor comprising:
   a rotor shaft defining an axis, said shaft mounted for rotation upon a bearing;
   a rotor mounted for rotation with said shaft, said rotor comprises a base portion and an annular rotor portion extending from said base portion, said base portion mounted adjacent an end segment of said rotor shaft substantially transverse to said axis and said annular rotor portion extending about said shaft substantially parallel to said axis, said bearing mounted at least partially within said annular rotor portion, said annular rotor portion including a rotor inner surface and a rotor outer surface, said rotor inner surface between said axis and said rotor outer surface;
   a magnet mounted to said rotor outer surface along said annular rotor portion, said magnet including a magnet outer surface opposite said rotor outer surface;
   a housing comprising an at least partially conical annular housing portion which at least partially extends within said annular rotor portion, said bearing mounted between said annular rotor portion and said shaft; and
   a stator mounted to said housing about said magnet outer surface.

2. The electric motor as recited in claim 1, further comprising a clutch mounted within said housing.

3. The electric motor as recited in claim 1, further comprising a clutch mounted within said housing, said clutch mounted to said shaft longitudinally outside of said bearing.

4. The electric motor as recited in claim 1, wherein said stator includes windings within a metallic lamination.

5. The electric motor as recited in claim 1, wherein said rotor is cup-shaped.

6. The electric motor as recited in claim 1, wherein said rotor defines a U-shaped member in longitudinal cross-section.

7. The electric motor as recited in claim 1, wherein said magnet extends along said rotor shaft toward said shaft end segment and does not extend past said shaft end segment.

8. A gas turbine engine system comprising:
   a gas turbine engine;
   an accessory gearbox mounted to said gas turbine engine, said accessory gearbox operable to initiate rotation of said gas turbine engine; and
   an electric starter motor operable to drive said accessory gearbox through a clutch contained within said electric starter motor, said electric starter motor mounted to said accessory gear box, said electric starter motor comprising:
   a rotor shaft connected to said accessory gearbox and defining an axis, said shaft mounted for rotation upon a bearing;
   a rotor mounted for rotation with said shaft, said bearing mounted at least partially within said rotor, said rotor including a rotor inner surface and a rotor outer surface, said rotor inner surface being between said axis and said rotor outer surface;
   a magnet mounted to said rotor outer surface along said annular rotor portion, said magnet including a magnet outer surface opposite said rotor outer surface; and
   a stator mounted about said magnet outer surface, said stator is mounted between a housing and said magnet outer surface.

9. An electric motor comprising:
   a rotor shaft defining an axis, said shaft mounted for rotation upon a bearing;
   a rotor mounted for rotation with said rotor shaft, said bearing mounted at least partially within said rotor, said rotor including a rotor inner surface and a rotor outer surface, said rotor inner surface between said axis and said rotor outer surface, said rotor comprises a base portion and an annular rotor portion extending from said base portion, said base portion substantially transverse to said axis and said annular rotor portion substantially parallel to said axis;
   a housing extending at least partially between said annular rotor portion and said shaft;
   a clutch mounted within said housing;
   a magnet mounted to said rotor outer surface, said magnet including a magnet outer surface opposite said rotor outer surface; and
   a stator mounted about said magnet outer surface.

10. An electric motor comprising:
    a rotor shaft defining an axis, said shaft mounted for rotation upon a bearing;

a rotor mounted for rotation with said rotor shaft, said rotor comprises a base portion and an annular rotor portion extending from said base portion, said base portion substantially transverse to said axis and said annular rotor portion substantially parallel to said axis, said bearing mounted at least partially within said annular rotor portion, said annular rotor portion including a rotor inner surface and a rotor outer surface, said rotor inner surface between said axis and said rotor outer surface;

a magnet mounted to said rotor outer surface, said magnet including a magnet outer surface opposite said rotor outer surface;

a housing comprising an annular housing portion which at least partially extends within said annular rotor portion, said bearing mounted between said annular rotor portion and said shaft;

a clutch mounted within said housing; and a stator mounted to said housing about said magnet outer surface.

11. An electric motor comprising:

a rotor shaft defining an axis, said shaft mounted for rotation upon a bearing;

a rotor mounted for rotation with said rotor shaft, said rotor comprises a base portion and an annular rotor portion extending from said base portion, said base portion substantially transverse to said axis and said annular rotor portion substantially parallel to said axis, said bearing mounted at least partially within said annular rotor portion, said annular rotor portion including a rotor inner surface and a rotor outer surface, said rotor inner surface between said axis and said rotor outer surface;

a magnet mounted to said rotor outer surface, said magnet including a magnet outer surface opposite said rotor outer surface;

a housing comprising an annular housing portion which at least partially extends within said annular rotor portion, said annular housing portion is at least partially conical, said bearing mounted between said annular rotor portion and said shaft; and a stator mounted to said housing about said magnet outer surface.

* * * * *

UNITED STATES PATENT AND TRADEMARK OFFICE
CERTIFICATE OF CORRECTION

PATENT NO.         : 7,131,275 B2
APPLICATION NO.    : 10/313175
DATED              : November 7, 2006
INVENTOR(S)        : James R. Gustafson It is certified that error appears in the above-identified patent and that said Letters Patent is hereby corrected as shown below:

Column 3, line 54:  insert --rotor-- before "shaft"

Column 3, line 59:  insert --rotor-- before "shaft"

Column 3, line 63:  insert --being-- before "between"

Column 4, line 52:  insert --being-- before "between"

Column 5, line 9:  insert --being-- before "between"

Column 6, line 9:  insert --being-- before "between"

Signed and Sealed this

Twenty-third Day of January, 2007

JON W. DUDAS
*Director of the United States Patent and Trademark Office*